United States Patent
Moneer et al.

(10) Patent No.: US 9,458,908 B2
(45) Date of Patent: Oct. 4, 2016

(54) VIBRATION ISOLATION SYSTEM WITH SUPPORT DIVIDED INTO SECTIONS, AND METHOD FOR CONTROLLING SAME

(71) Applicant: Integrated Dynamics Engineering GmbH, Raunheim (DE)

(72) Inventors: Shatat-Herres Moneer, Raunheim (DE); Mario Pabst, Muehlhausen (DE); Peter A. Kropp, Mainz (DE)

(73) Assignee: Integrated Dynamics Engineering GmbH (DE)

( * ) Notice: Subject to any disclaimer, the term of this patent is extended or adjusted under 35 U.S.C. 154(b) by 203 days.

(21) Appl. No.: 14/463,053

(22) Filed: Aug. 19, 2014

(65) Prior Publication Data
US 2015/0069205 A1 Mar. 12, 2015

(30) Foreign Application Priority Data

Sep. 10, 2013 (EP) .................................. 13183754

(51) Int. Cl.
*F16F 15/027* (2006.01)
*F16F 15/023* (2006.01)

(52) U.S. Cl.
CPC ......... *F16F 15/027* (2013.01); *F16F 15/0232* (2013.01)

(58) Field of Classification Search
CPC .. F16F 15/027; F16F 15/022; F16F 15/0232; G03F 7/709
See application file for complete search history.

(56) References Cited

U.S. PATENT DOCUMENTS

| | | | | |
|---|---|---|---|---|
| 4,153,227 A * | 5/1979 | Gamaunt | ............ | F16F 15/0232 248/575 |
| 5,038,835 A * | 8/1991 | Breyer | ................... | F16F 15/027 139/1 R |
| 5,092,800 A * | 3/1992 | Hirt | .......... | B63H 23/32 248/550 |
| 5,141,201 A * | 8/1992 | Mizuno | .................. | F16F 9/532 248/550 |
| 6,684,132 B2 * | 1/2004 | Wakui | ................... | F16F 15/027 248/550 |
| 7,740,234 B2 * | 6/2010 | Robbins | ............ | B60G 17/0162 248/550 |
| 2002/0140921 A1 | 10/2002 | Morisada | | |
| 2004/0000215 A1 * | 1/2004 | Phillips | ............... | F16F 15/0232 248/559 |
| 2009/0050779 A1 * | 2/2009 | Arimoto | ............... | F16F 15/027 248/562 |
| 2011/0062306 A1 * | 3/2011 | Heiland | ................ | F16F 15/027 248/636 |
| 2013/0264455 A1 * | 10/2013 | Robbins | ............... | F16F 15/022 248/564 |
| 2014/0209779 A1 * | 7/2014 | Kropp | ................... | F16F 15/027 248/550 |
| 2015/0048234 A1 * | 2/2015 | Almazan Campillay | ........... | F16F 15/022 248/568 |
| 2015/0142182 A1 * | 5/2015 | Kimura | ................ | F16F 15/002 700/280 |

FOREIGN PATENT DOCUMENTS

| | | | | |
|---|---|---|---|---|
| EP | 1860342 | * | 11/2007 | ............. F16F 15/00 |
| EP | 1921502 A1 | | 5/2008 | |
| EP | 2295829 A1 | | 3/2011 | |
| JP | 2007322706 A | | 12/2007 | |

* cited by examiner

*Primary Examiner* — Michael Safavi
(74) *Attorney, Agent, or Firm* — Kaplan Breyer Schwarz & Ottesen, LLP

(57) ABSTRACT

A vibration isolation system which comprises a support divided into a plurality of rigid sections on which a displaceable stage is arranged. The sections are arranged on pneumatic bearings, and the pneumatic bearings of the individual sections are controlled independently from each other and based on the position of the displaceable stage.

13 Claims, 5 Drawing Sheets

VIBRATION ISOLATION SYSTEM WITH SUPPORT DIVIDED INTO SECTIONS, AND METHOD FOR CONTROLLING SAME

CROSS-REFERENCE TO RELATED APPLICATION

European Patent Application No. 13 183 754.4, with a filing date of Sep. 10, 2013, is incorporated herein by reference.

FIELD OF THE INVENTION

The invention relates to a vibration isolation system, in particular for anti-vibration mounting of machines for manufacturing semiconductor devices, which comprises a stage that is displaceable on a support. The invention further relates to a method for controlling a vibration isolation system.

BACKGROUND OF THE INVENTION

Prior art vibration isolation systems are in particular based on pneumatic isolators and may include so-called stage feed-forward. Besides a pneumatic bearing, the isolators comprise position or acceleration sensors. Position sensors are in particular used to detect the height of the anti-vibration mounted load at the location of each isolator.

In stage feed-forward control, acceleration and position information of the displaceable stage are transferred to the controller of a vibration isolation system, which then calculates and outputs control signals for the force actuators of the vibration isolation system based on feed-forward control according to which the forces induced by the displaceable mass are anticipated in six degrees of freedom and compensation forces are provided. Such control systems can be employed independently from and in addition to the actual (feedback and position) control of the vibration isolation system. Occurring forces change depending on the weight, acceleration and displacement of the displaceable stage and therefore determine the compensation forces which are necessary. The compensation forces are usually provided by magnetic actuators.

For many applications (e.g. in the handling of systems concerning the manufacturing of flat panels) the compensation forces which are required have become so large that the use of conventional Lorentz motors (permanent magnets and moving coil system) is no longer economically feasible. Therefore, the trend is to provide the force otherwise.

European patent application EP 2 295 829 A1 (Integrated Dynamics Engineering GmbH) discloses an improved active vibration isolation system which uses the valves of the pneumatic subsystem, i.e. the valves of the pneumatic bearings, to provide compensation forces in a vertical direction. The valves are otherwise only provided for moving the entire system to a specific vertical operating point. However, by appropriate control it is even possible, via changes in pressure, to provide a sufficiently large range of input forces, so that compensation forces in a vertical direction can substantially be provided by the pneumatic subsystem.

In particular for the static forces which in case of a load shift have to be maintained for a rather long time, continuous current supply to the Lorentz motors is now no longer necessary, rather these forces are produced by a pressure increase in the isolators.

In order to provide necessary horizontal compensation forces it is possible to produce a mechanical short circuit to the ground when a force impulse is caused in a horizontal direction, for example by non-Newtonian fluids in the isolators, semi-active, or magnetorheological or electrorheological fluids. This makes it possible to isolate even rather large machines from vibrations of the ground and to minimize the impact of forces induced by displaceable parts on the supported mass, and to minimize temporal effects.

With increasing size of devices to be produced, such as flat panel displays, the floor space required, i.e. the footprint for vibration isolation is increasing as well.

A continuing requirement for the manufacturing process is to allow the panel to be moved over the entire surface by means of displaceable stages, in order to be able to place any portion of the workpiece under specific tools. Hence, the required displacement distance of a displaceable stage is increasing, and thus the support surface for the displacement distance is increasing as well.

So it is hardly possible anymore to provide a sufficiently large uniform support for the displaceable stage, which will not be deformed.

Instead, it is necessary to divide the support into a plurality of sections which are coupled to each other only moderately.

In this case it will be necessary to use more than the typical three or four isolators, not only because of the masses employed. Instead, three or four isolators may be used for each section.

If because of the great mass an appropriately large number of isolators is provided, isolators are connected together to form groups which are provided with control signals from a control loop. For example, four groups may be provided, one at each of the four corners of a support, each group including a plurality of isolators and the isolators of a group are driven in the same manner.

If a stage feed-forward system is employed, it will use position and acceleration signals of the displaceable stage to generate control signals for the valves, which are typically supplied to a so-called pneumatic axis which combines logic combinations of isolator groups and represents physical degrees of freedom (X—rotation, Y—rotation, and Z—translation). However, in principle it is also possible to generate control signals for individual groups of isolators or for individual isolators.

Each of the isolators has a valve for the pneumatic bearing and at least one distance sensor for the vertical direction. In order to combine groups of actuators, an electric line may be installed for each group of valves and controlled by the same control signal.

However, it is not possible by means of the distance sensors to detect a deflection of the structure. Also, a deflection cannot be counteracted when isolators are connected together as actuators across sections.

OBJECT OF THE INVENTION

The invention is based on the object to provide a vibration isolation system with a large footprint in which the impact of a displaceable stage is minimized.

SUMMARY OF THE INVENTION

The invention relates to a vibration isolation system which is in particular provided for accommodating machines for manufacturing semiconductor devices with vibration isolation. In particular, the invention relates to a vibration isolation system used in the manufacturing of display panels.

The vibration isolation system comprises an anti-vibration mounted support which is divided into a plurality of rigid section, and the sections are mounted on pneumatic bearings that are effective at least in a vertical direction.

The support serves to support a displaceable stage on which for example a display panel is moved on the support.

Thus, the support is divided into a plurality of sections, wherein an intersection area between the sections has a lower stiffness than the sections. That means, the sections may be interconnected. In particular, it is contemplated that the support consists of a plurality of plates of granite or of a composite material, for example. If these plates are connected, for example by being screwed together, rigidity at the junction will be lower. Therefore, in the context of the invention a support consisting of a plurality of sections may in particular be a support that consists of several plates which are interconnected.

The displaceable stage is displaceable at least along the extension direction of the sections.

The pneumatic bearings preferably constitute a component of an isolator which in addition to the pneumatic bearing comprises at least one sensor for position and/or acceleration detection. Optionally, the isolator further comprises electrically controllable magnetic actuators for active vibration isolation (e.g. Lorentz motors), which may in particular serve for active vibration isolation in a horizontal direction. Therefore, in addition to the active vibration isolation in the horizontal direction according to the invention, it is in particular conceivable to provide active vibration isolation in further spatial directions by means of actuators.

The vibration isolation system further comprises sensors for detecting the height of the support at a plurality of locations of the support. Preferably, these sensors are integrated in an isolator each of which further comprises a pneumatic bearing.

Furthermore, the pneumatic bearings are controllable based on the signals from the sensors for detecting the height of the support and at the same time based on the position of the displaceable stage. "Controlling" means to supply a control signal to the pneumatic bearings, through which the pressure in the pneumatic component is changed, and hence the support force.

Thus, the feed-forward control of the pneumatic bearings not only takes into account the signal from the sensors, but also the position of the displaceable stage.

Also, it is taken into account that the stage moves over a plurality of sections of the support, which are not rigidly connected.

In particular, the pneumatic bearings of a section are controllable independently from the pneumatic bearings of an adjacent section.

Thus, according to the invention the support is not considered as a uniform rigid plate, rather the sections of the support are controlled individually.

There are at least groups of isolators or pneumatic bearings which are controlled by a control signal that is independent from the control signal of all other sections.

In one embodiment of the invention, the support is divided into at least three rigid sections.

Further, each of the sections is anti-vibration mounted on at least four pneumatic bearings which are typically arranged at the periphery of the respective section.

The bearings of each section are controlled independently from the bearings of the other sections.

Preferably, each section has at least one sensor for detecting the height.

More preferably, each bearing which in particular is part of an isolator has associated therewith one sensor.

In one embodiment of the invention, the vibration isolation system comprises means for storing a data set during a learning phase, which data set represents a change in height of a plurality of support points of the support during a single pass of the displaceable stage. This error signal is used to adjust the parameters at the support points. These parameters are then used during operation to calculate a compensation signal for controlling the pneumatic bearings.

Thus, the support is divided into support points, and in a so-called learning pass an error signal is generated and is stored as a data set which represents the influence of the displaceable stage on the support points.

The error signal is then used, during the learning phase, to adjust the parameters at the support points in a manner so that the error signal is minimized. During normal operation, the parameters of the support points are then used to generate a compensation signal.

This compensation signal may then be added to the conventional active control during operation of the vibration isolation system.

The invention further relates to a method for controlling a vibration isolation system which comprises a displaceable stage that is arranged on an anti-vibration mounted support which is divided into a plurality of rigid sections, and wherein the height of the support is determined at various points using a plurality of sensors.

Pneumatic bearing by means of which the rigid sections of the support are supported are controlled based on the position of the displaceable stage.

In a preferred embodiment of the invention, the support is divided into a plurality of support points, and in a learning phase a data set is generated which represents a change in height of the plurality of support points during displacement of the stage over the support, and the pneumatic bearing are controlled taking into account this data set. Preferably, for this purpose, a compensation signal is generated.

During displacement of the stage in any direction, the nearest pneumatic bearings are controlled based on the position of the stage.

So the compensation signal is added to the usual height control signal. The compensation signal preferably depends on the position of the stage as well as on parameters stored for a support point. The compensation signal is used to control the pneumatic bearings adjacent to a support point.

Preferably, vertical vibration isolation is solely accomplished using the pneumatic bearings.

In one embodiment of the invention, at least part of the support points are located between the sensors, and the height of the support at these support points is determined by interpolation of the height of the support at the location of adjacent sensors.

DETAILED DESCRIPTION

The invention will now be described in more detail by way of a schematically illustrated exemplary embodiment with reference to the drawings of FIGS. 1 to 8.

Figure 1:
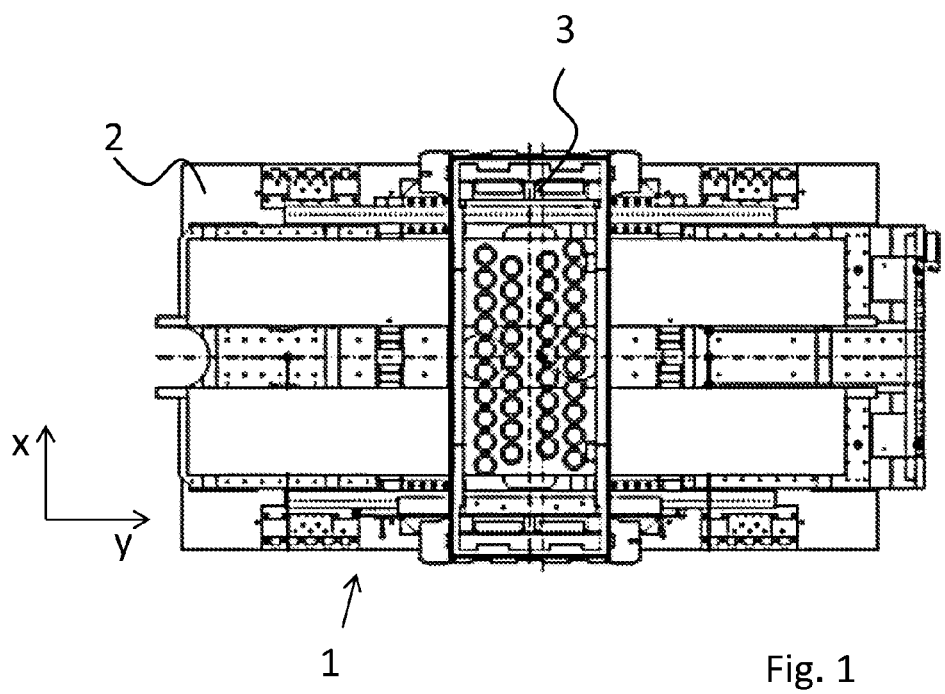
FIG. 1 is a schematic top plan view of a vibration isolation system.

FIG. 1 is a schematic top plan view of a vibration isolation system.

Vibration isolation system 1 comprises a support 2 on which a displaceable stage 3 is arranged.

Stage 3 is used, for example, to support a substrate for a display panel.

Stage 3 is displaceable on support 2, at least in Y-direction, in order to convey the component to be processed to different stations.

In the present exemplary embodiment, displaceable stage 3 can also be displaced in X-direction. Displaceable stage 3 comprises an output port connected to a controller, via which the position of stage 3 is transferred (not shown). The controller is part of a vibration isolation system.

Figure 2:
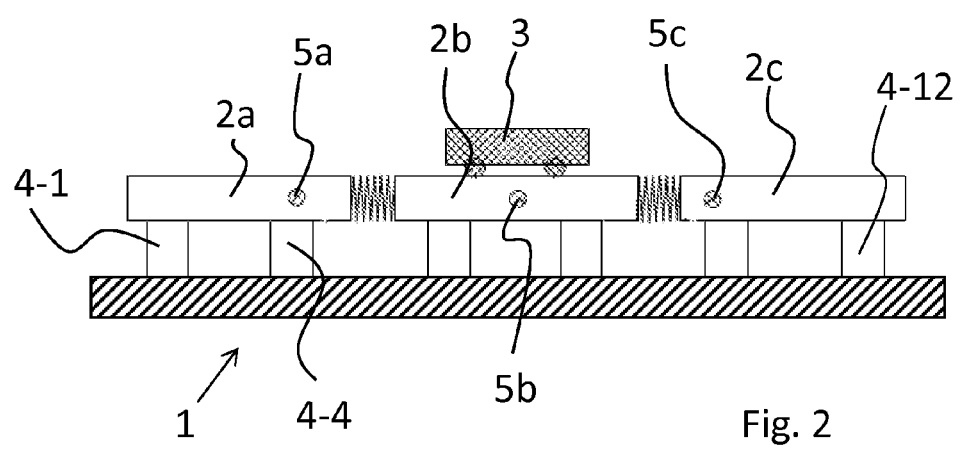
FIG. 2 is a symbolic and schematic side view of such a vibration isolation system 1.

FIG. 2 is a symbolic and schematic side view of such a vibration isolation system 1.

It can be seen that the support is divided into three rigid sections 2a, 2b, 2c.

Rigid sections 2a, 2b, 2c are anti-vibration mounted on pneumatic bearings 4-1, 4-4, 4-12.

In order to facilitate the understanding of the invention, only a two-dimensional view is shown.

Figure 3:
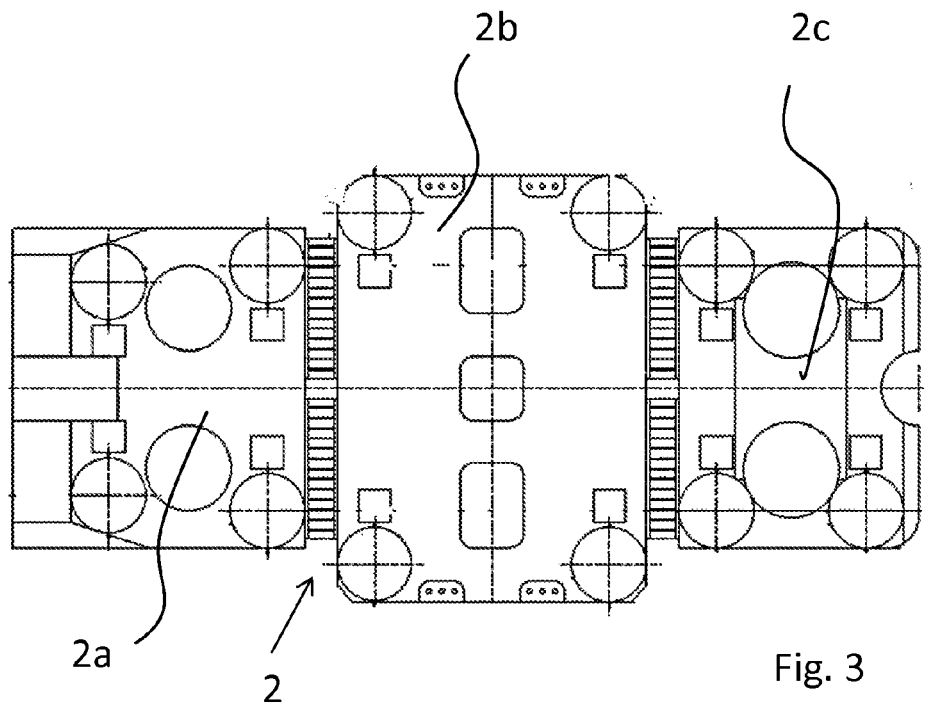
FIG. 3 is another view illustrating the division of support 2 into sections 2a, 2b, 2c.

FIG. 3 is another view illustrating the division of support 2 into sections 2a, 2b, 2c.

Figure 4:
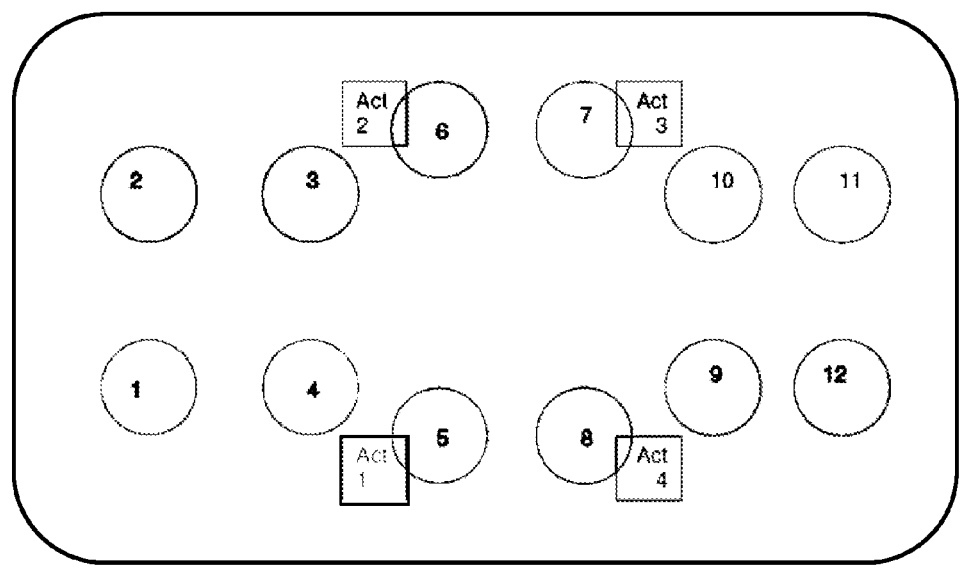
FIG. 4 shows the pneumatic bearings and isolators associated with sections 2a, 2b, 2c illustrated in FIG. 3, which are numbered.

FIG. 4 shows the pneumatic bearings and isolators associated with sections 2a, 2b, 2c illustrated in FIG. 3, which are numbered.

Section 2a rests on bearings 1 to 4, section 2b on bearings 6 to 8, and section 2c on bearings 9 to 12.

If now support 2 would be considered as a plate, which is the conventional way, usually isolators 2, 3 and 6, isolators 7, 10 and 11, isolators 1, 4 and 5, and isolators 8, 9 and 12 would be combined into a respective group of isolators that is operated with the same control signal.

When stage 3 is displaced it can be expected that due to the finite stiffness each of sections 2a, 2b, 2c will move around a respective own pivotal point 5a, 5b, 5c, as shown in FIG. 2, and not only around an overall center of mass of the entire system.

Figure 5:
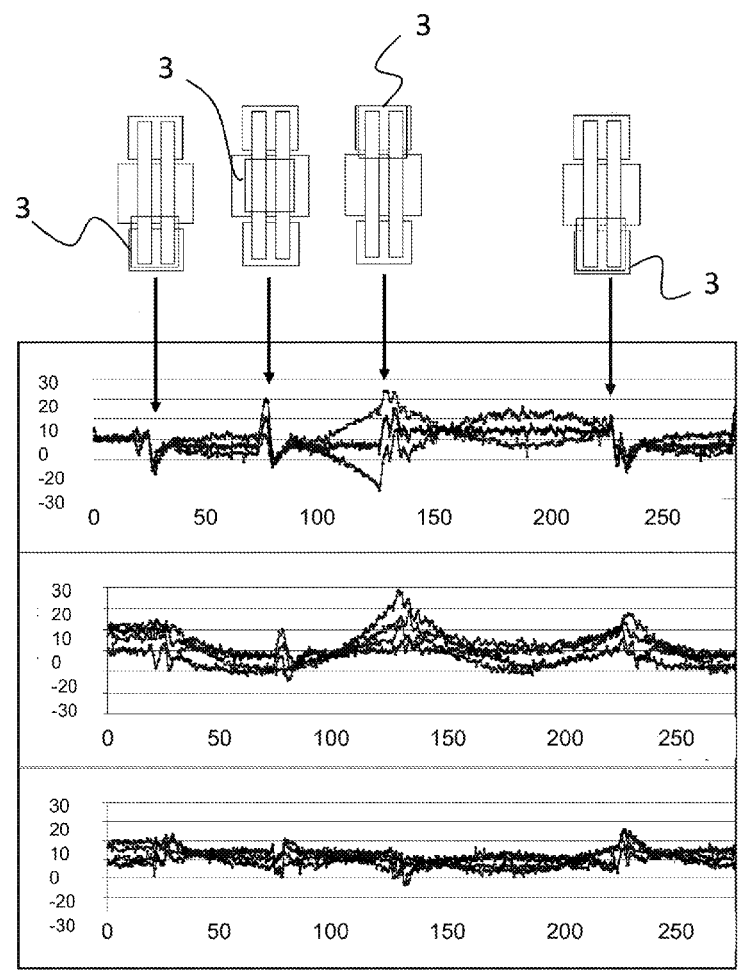
FIG. 5 illustrates the signal of the sensors of the individual isolators related to different positions of the displaceable stage.

FIG. 5 illustrates the signal of the sensors of the individual isolators related to different positions of the displaceable stage.

The upper graphs show the signal from the sensors at positions 1 to 4 in FIG. 4, the graphs in the middle show the signal from sensors 6 to 8 in FIG. 4, and the lower graphs the signal from sensors 9 to 12 in FIG. 4.

It will be understood that in each case the signal from four sensors is given, and in this schematic diagram it is irrelevant for the understanding of the invention from which sensor exactly the individual graph is derived.

The positional deviation in micrometers is plotted on the y-axis in each case, and the time on the x-axis.

The related position of the stage is indicated by the arrows.

It can be seen that the positional deviations in the individual sections depend on the position of the stage.

Figure 6:
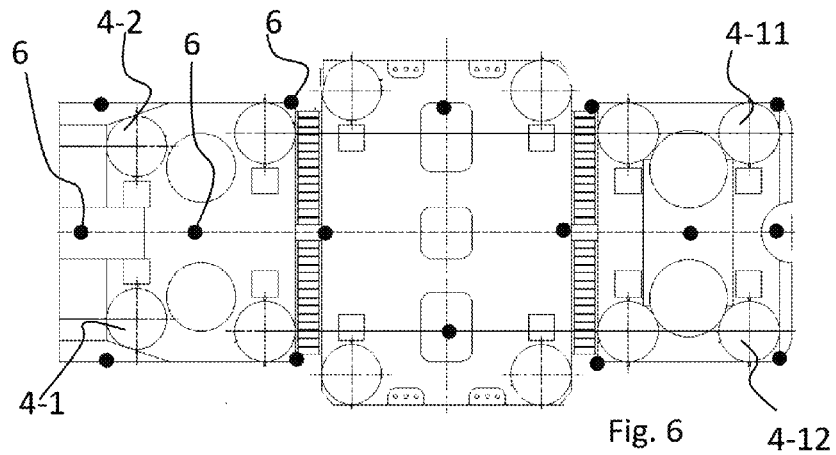
FIG. 6 illustrates an exemplary arrangement of support points 6.

FIG. 6 illustrates an exemplary arrangement of support points 6.

The arrangement of the isolators in FIG. 6 corresponds to that of FIG. 3. Pneumatic bearings 4-1 through 4-12 can be seen, the position of which corresponds to the numbering in FIG. 4.

Now, support points 6 are no longer at the location of the bearings but are distributed over the support. The pneumatic bearings are at the location of the sensors. It will be understood that the sensors may also be disposed spaced from the bearings.

Support points 6 which now have to be considered virtually and which are located between the bearings and sensors are used to filter the signal.

If actuators are to be used for a stage feed-forward control, the groups as in the pneumatic (height) control will not be useful.

Instead, according to the invention the actuators are grouped and connected in a different way in order to be suitable for use as actuators for compensating the forces caused by the displacement of the stage.

In this case, the stage is preferably considered as a weight force acting on the center of mass of the stage at the respective position.

Since stiffness, though being finite, is large, it can be assumed that the pivotal points are not co-located with the centers of mass of the substructures, but are clearly offset towards the junctions of sections 2a, 2b, 2c. The distance sensors provided can be used to measure how the structures do behave in detail.

Displaceable stage 3 can move in the X-direction and in the Y-direction and provides its position information $$\vec{T}(t) = \begin{pmatrix} Cpos(t) \\ Ypos(t) \end{pmatrix}$$

to the control system. The latter then has to provide control signals to the available ports of valves $\vec{V}(t)=(V_1\ V_2\ \ldots\ V_N)$ such that the sum of the quadratic deviation of the heights $H_i(t)$ from the respective zero-position $N_i$ is minimized during the procedure:

$$\int E(t)dt = \int \sum_{i=1}^{N} (H_i(t) - N_i)^2 dt = \min.$$

Since the control system operates in discrete time, the integral is transferred into a sum:

$$\sum_t E(t) = \sum_t \sum_{i=1}^{N} (H_i(t) - N_i)^2 = \min,$$

wherein typically a sum is calculated over a set of points in time t in a range of a motion trajectory of the displaceable stage. Thus, a function $F_i(\vec{T})$ is searched which generates an output signal for valves $V_i$ from the position information $\vec{T}$ of the displaceable stage:

$$V_i(t) = F_i(\vec{T}(t))$$

with $$\sum_t \sum_{i=1}^N (H_i(t) - N_i)^2 = \min.$$

In feed-forward systems, the searched functions $F_i(\vec{T}(t))$ are usually those that depend linearly on the input variables Xpos and Ypos, because they are related to simple load shifts whose force effects scale linearly with the distance from the center of mass. In addition, the function linearly depends on the position of the force actuator, because the force effect of the actuator scales with the length of the lever arm to the center of mass. Thus, the family of functions could be written as a scalar matrix.

In case of the multi-part mobile system illustrated, the functions are much more complex, since sections may move around different pivotal points.

Therefore, it is no longer possible by means of a linear function to generate valve control signals that will keep the system in a sufficiently stable position when the stage is displaced. Due to the complex oscillatory geometry, a purely arithmetical approach to this problem is also likely to be infeasible. However, the problem can be solved in the following way:

The area over which the displaceable stage can be moved is divided into a finite number of quadrants. The intersections of the quadrants may, but need not coincide with the locations of the valves/isolators $V_i$. Nor is it necessary for the quadrants to be equal in size, or to be square, or uniform.

For the sake of simpler illustration, however, it is assumed here that the quadrants are square and evenly distributed. In order to further simplify the illustration only one spatial direction is considered here (as illustrated in FIG. 2).

The basic idea for a feed-forward control system for compensating the force effect of a displaceable stage is as follows:

The valve output signal for a valve of an isolator is defined as a function of only the support points of the quadrants, and for intermediate positions an interpolation based on the surrounding support points is used. This may be a linear interpolation as a first approximation, but a spline or other polynomial interpolation may also be considered in order to provide a continuous function at the support points.

Figure 7A:
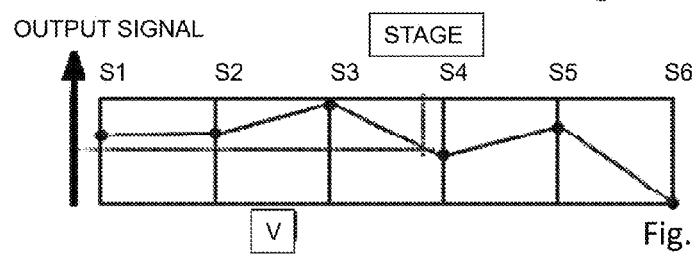
FIGS. 7(A), 7(B), and 7(C) illustrate the output signal at different positions of the stage.
Figure 7B:
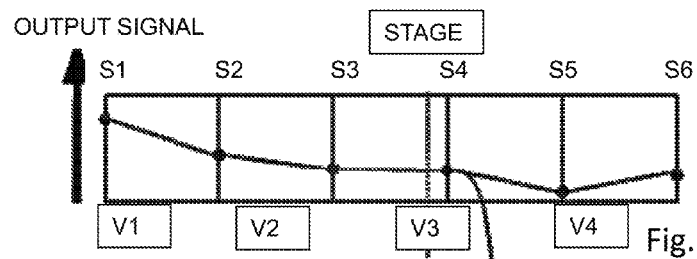
Figure 7C:
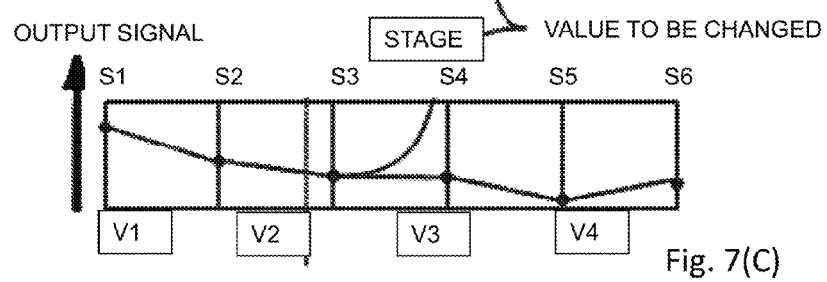

Then, a matrix with scalars has to be provided and defined for each valve output signal $V_i$, which is used for calculating the output signal, as shown in FIGS. 7(A) to 7(C) which illustrates the output signal at different positions of the stage.

In order to "compute" the output signal $V_i$, merely the matrix value corresponding to the "position" of the stage has to be read from the scalar matrix. This parameter matrix $\vec{S}$ may formally be deconvolved and likewise interpreted as a parameter vector.

Here, in the one-dimensional example of FIG. 2, a vector of 6 scalars ($\vec{S} = \{S_j\}$) is resulting.

The intermediate values are obtained, for example, by linear interpolation between two support points. In this way, the optimization of the valve control signals as a function of continuous position values (Xpos/Ypos) is reduced to an optimization of a finite number of scalars. Therefore, the function for calculating an output signal $V_i$ is reduced to a functional relationship which is based on (a few) parameters ($\vec{S}$). Now, for all $V_i$ an optimal set of respective corresponding parameters $\vec{S}_i$ has to be found, which minimizes the difference in height between target height and current height when the stage is displaced.

The output signals $V_i$ need not be identical to the number of available valves/isolators but may designate groups of interconnected valves/isolators as well. This may be suitable, for example, if only a finite number of (electric) ports is available for control purposes. The most effective way, however, would be to use all valves so that all available degrees of freedom are exploited.

Therefore, in each individual case a balance has to be found between costs and possible performance.

The matrix method presented herein may be simplified as follows.

Parametrization of all parameters actually evades a manual procedure, since even with only 6×3 support points and 10 (groups) of valves already 180 parameters have to be adjusted.

However, parameterization can be greatly simplified and made accessible to a meaningful manual parameterization:

As can be seen in FIG. 2, a valve port is connected to an isolator and thus to a locally restricted actuator effect.

That means, the position of the valve determines for which position of the stage this actuator should and can usefully apply its force effect.

Since due to their dimension (and because of the costs) the actuators are only finite in number and distributed as well as possible beneath the load, the area to be considered naturally divides into regions that can be associated with the respective actuators. So it is no longer necessary to provide an own vector $\vec{S}_i$ for each valve output signal $V_i$, but only one vector $\vec{S}$ for all $V_i$.

For calculating the output signals $V_i$, the interpolated intermediate values from vector $\vec{S}$ are used.

Fitting of the parameters can be accomplished experimentally:

When the stage is displaced and as a result thereof the height at a certain point falls below the target height, it will be intuitively clear that the support points in vector $\vec{S}$ around this position have to be raised. In FIG. 7(B) (middle), this would be support point S4, in the graph below support point S3. In the calculation, the stage is considered as a point load which is arranged in the center of mass of the stage depending on the respective position thereof.

For a person skilled in the art it is now possible to implement a fully automatic so-called adaptive method for fitting the parameters of $\vec{S}$.

The selection of the parameters to be changed is available, as well as information about the extent of the error (so-called error signal).

With the position information of the displaceable stage as a so-called reference signal, this parameter can now be fitted automatically using standardized techniques for adaptation of digital filters (e.g. least mean square algorithm, RLS, or others). After this "learning phase", the alteration of parameterization can be frozen and stored.

It will be understood that it is also conceivable to regularly or continuously compute an error signal during operation, and to constantly adjust the parameters at the support points. Thus, the learning phase will continue during operation in this case. The vibration isolation system will thus be able to adapt itself and is in particular able to adapt to altering stiffness of the components caused by mechanical wear.

Figure 8:
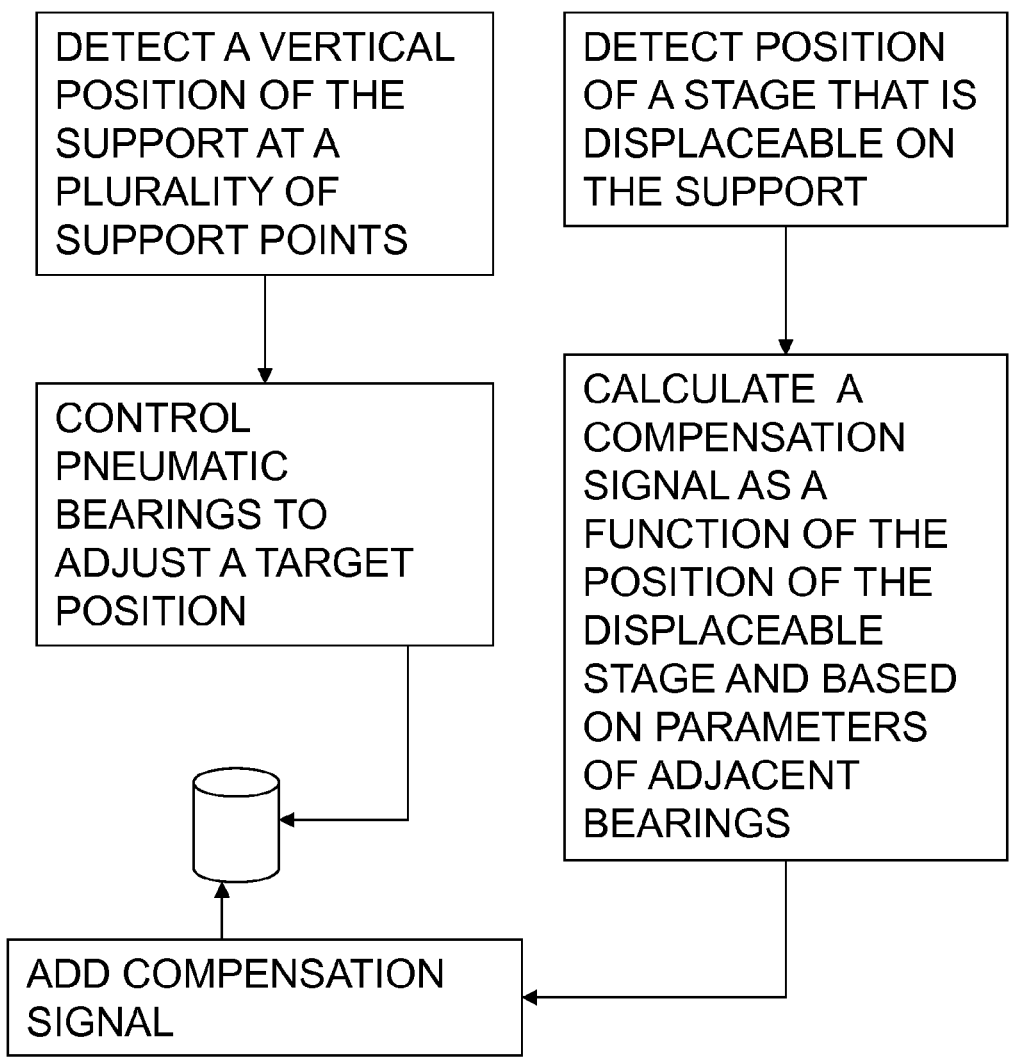
FIG. 8 illustrates a method of control.

Referring to FIG. 8, the method of the invention will be explained in detail with reference to a flowchart.

The vertical position of the support is detected at a plurality of support points using a plurality of sensors. Usually, the position sensors will be arranged at the pneumatic bearings. Thus, the support points of the pneumatic bearings and the sensors correspond to each other.

The pneumatic bearings are controlled for adjusting a target position.

It is particularly contemplated to take into account the impact of a change in position at one bearing to the position of the support at the other bearings. Moreover, vibrations of the ground may be detected in the sense of a feed-forward control loop, and the vibration may be counteracted by controlling the pneumatic bearings. Such a scheme for vertical vibration isolation is essentially known.

According to the invention, the position of a stage displaceable on the support is detected. Based on the position of the stage and on parameters which correspond to the location of the respective support point, a compensation signal is calculated. These parameters in particular depend on the specific nature of the support which is not considered as a rigid plate, since it is divided into a plurality of rigid sections which are interconnected.

The compensation signal is added to the conventional height control signal.

In this way, considerably improved vibration isolation is easily made possible.

It is essential for the invention that the pneumatic bearings underneath the several sections of the support are controlled independently, at least in part. Thus, the bearings are not combined into groups and assumed to be located at the corners of the support, rather the sections of the support are considered individually and controlled individually.

The invention claimed is:

1. A method for controlling a vibration isolation system, wherein the vibration isolation system comprises a displaceable stage arranged on an anti-vibration mounted support which is divided into a plurality of rigid sections; the method comprising:
   detecting the height of the support at different points thereof using a plurality of sensors; and
   controlling pneumatic bearings which support the rigid sections of the support based on the position of the displaceable stage.

2. The method for controlling a vibration isolation system as claimed in claim 1, comprising:
   dividing the support into a plurality of support points;
   generating, in a learning phase, a data set which represents a change in height of the plurality of support points during displacement of the stage over the support; and
   subsequently controlling the pneumatic bearings while taking into account said data set.

3. The method for controlling a vibration isolation system as claimed in claim 2, wherein the data set includes a calculated compensation signal which is a function of the position of the stage and of the adjacent pneumatic bearings and which is added to a height control signal.

4. The method for controlling a vibration isolation system as claimed in claim 1, comprising,
   for calculating signals for controlling the pneumatic bearings, dividing the support into a plurality of support points; and
   when the stage is displaced in any direction, controlling the pneumatic bearings closest to a center of mass of the stage.

5. The method for controlling a vibration isolation system as claimed in claim 2, wherein at least part of the support points are located between the sensors, wherein the height of the support at these support points is determined by interpolation of the height of the support at the location of adjacent sensors.

6. A vibration isolation system, comprising:
   an anti-vibration mounted support which is divided into a plurality of rigid sections which are mounted on pneumatic bearings that are effective at least in a vertical direction, wherein said support serves to support a displaceable stage;
   sensors for detecting a height of the support at a plurality of points of the support;
   wherein the pneumatic bearings are controllable based on the signals from the sensors for detecting the height of the support and at the same time based on the position of the displaceable stage.

7. The vibration isolation system as claimed in claim 6, wherein the rigid sections are coupled with each other.

8. The vibration isolation system as claimed in claim 6, wherein the pneumatic bearings of a section are controllable independently from the pneumatic bearings of an adjacent section.

9. The vibration isolation system as claimed in claim 6, wherein each section comprises at least one sensor for detecting the height.

10. The vibration isolation system as claimed in claim 6, wherein magnetic actuators are arranged on the pneumatic bearings.

11. The vibration isolation system as claimed in claim 6, wherein the vibration isolation system comprises means for storing a data set during a learning phase, which data set represents a change in height at a plurality of support points of the support during one pass of the displaceable stage.

12. The vibration isolation system as claimed in claim 6, wherein the support is divided into at least three rigid sections.

13. The vibration isolation system as claimed in claim 12, wherein each of the sections is anti-vibration mounted on at least four pneumatic bearings, wherein the bearings of a section are controlled independently from the bearings of the other sections.

* * * * *